United States Patent
Maeda et al.

[11] Patent Number: 5,959,831
[45] Date of Patent: Sep. 28, 1999

[54] CAPACITOR ELEMENT FOR SOLID ELECTROLYTIC CAPACITOR

[75] Inventors: Takahiro Maeda; Shouichi Yanagi; Chojiro Kuriyama, all of Kyoto, Japan

[73] Assignee: Rohm Co., Ltd., Kyoto, Japan

[21] Appl. No.: 08/938,824

[22] Filed: Sep. 26, 1997

[30] Foreign Application Priority Data

Sep. 27, 1996 [JP] Japan .................................. 8-256195

[51] Int. Cl.⁶ .............................. H01G 9/00; H01G 9/04
[52] U.S. Cl. ............................ 361/523; 361/531; 361/540
[58] Field of Search ..................................... 361/508, 509, 361/513, 523, 525, 528, 529, 531, 533, 534, 535, 540

[56] References Cited

U.S. PATENT DOCUMENTS 5,461,538  10/1995  Kuriyama .................................. 361/528

FOREIGN PATENT DOCUMENTS 7-74062  3/1995  Japan .............................. H01G 9/052

OTHER PUBLICATIONS

JP 07 23 0937 A., In: Patent Abstracts of Japan; 1995.

*Primary Examiner*—Kristine Kincaid
*Assistant Examiner*—Anthony Dinkins
*Attorney, Agent, or Firm*—Michael D. Bednarek; Crowell & Moring LLP

[57] ABSTRACT

A capacitor element for a solid electrolytic capacitor includes a capacitor chip which is a compacted mass of valve metal powder, and an anode wire projecting from an end face of the capacitor chip. The capacitor chip includes a chamfer portion located adjacent to and surrounding the end face. Typically, the capacitor chip is square in cross section, and the chamfer portion includes a quadrilaterally arranged group of chamfer faces.

7 Claims, 6 Drawing Sheets

CAPACITOR ELEMENT FOR SOLID ELECTROLYTIC CAPACITOR

BACKGROUND OF THE INVENTION

1. Field of the Invention:

The present invention relates to a capacitor element for a solid electrolytic capacitor such as tantalum capacitor or aluminum capacitor. The present invention also relates to a device and a process for making such a capacitor element.

2. Description of the Related Art

As disclosed in U.S. Pat. No. 5,461,538 (corresponding to Japanese Patent Application Laid-open No. 7-74062) and as illustrated in FIG. 10 of the accompanying drawings, a typical capacitor element A for a prior art solid electrolytic capacitor includes a porous capacitor chip A1 and an anode wire A2 projecting from a top face A1$a$ of the chip A1. The capacitor chip A1 is prepared by compacting tantalum powder into a porous mass and then sintering the porous mass. The anode wire A2 is also made of tantalum. For providing a capacitor function, the capacitor element is subjected to the following process steps.

First, as shown in FIG. 11, the porous sintered capacitor chip A1 is immersed in an aqueous solution B of e.g. phosphoric acid and subjected to anodic oxidation (electrolytic oxidation) by applying a direct current. As a result, a dielectric coating A3 of e.g. tantalum pentoxide is formed on the surfaces of the tantalum particles and on an immersed root portion of the anode wire A2, as shown in FIG. 12. In the following description, the portion of the dielectric coating A3 formed on the root portion of the anode wire A2 is designated by reference numeral A3$a$ and referred to as "extension".

Then, as shown in FIG. 13, the dielectrically coated chip A1 is immersed in an aqueous solution C of e.g. manganese nitrate to such an extent that the top surface A1$a$ of the chip A1 is not wet with the manganese nitrate solution, the chip A1 being thereafter taken out of the solution for baking. This step is repeated plural times to form a layer A4 of solid electrolyte (e.g. manganese dioxide) on the dielectric coating A3, as indicated by phantom lines in FIG. 13.

Finally, as shown in FIG. 14, a metallic cathode terminal layer A5 (made of silver or nickel for example) is formed on the solid electrolyte layer with an intervening layer of e.g. graphite being interposed between the cathode terminal layer A5 and the electrolyte layer A4.

The extension A3$a$ of the dielectric coating A3 formed on the root portion of the anode wire A2 is necessary for electrically separating between the solid electrolyte layer A3 (cathode) and the anode wire A2 (anode).

On the other hand, at the time of forming the solid electrolyte layer A4, the capacitor chip A1 is immersed in the manganese nitrate solution C up to the point where the surface C1 of the solution starts bulging at the peripheral edge of the top face A1$a$ of the chip A1 due to the surface tension of the solution. As a result, the top face A1$a$ of the chip A1 is held at a level which is lower by an amount h2 than the surface C1 of the solution. Such immersion makes it possible to maximize the contact area between the dielectric coating A3 and the solid electrolyte layer A4 while preventing the solid electrolyte layer A4 from coming into direct contact with the anode wire A2.

However, if the surface C1 of the manganese nitrate solution C vibrates in the above-described state due to external shocks or forces, the surface tension of the solution is imbalanced, which causes the solution to flow on the top face A1$a$ of the chip toward the anode wire A2 due to the depth h2 of the immersion. As a result, a portion of the solid electrolyte layer A4 may extend beyond the extension A3$a$ of the dielectric coating A3 into direct contact with the anode wire A2, thereby causing shorting between the cathode and the anode.

SUMMARY OF THE INVENTION

It is, therefore, an object of the present invention is to provide a capacitor element which eliminates or reduces the above-described problems.

Another object of the present invention is to provide a compacting device which can be advantageously used for making such a capacitor element.

A further object of the present invention is to provide a process for making such a capacitor element.

According to a first aspect of the present invention, there is provided a capacitor element for a solid electrolytic capacitor comprising: a capacitor chip which is a compacted mass of valve metal powder; and an anode wire projecting from an end face of the capacitor chip; wherein the capacitor chip includes a chamfer portion located adjacent to and surrounding said end face.

The technical advantages obtainable by the capacitor element of the present invention will be specifically described later on the basis of the preferred embodiments which are described hereinafter with reference to the accompanying drawings.

Typically, the capacitor chip is polygonal (tetragonal or square in particular, in cross section, and the chamfer portion includes a polygonally arranged group of chamfer faces.

Each of the chamfer faces may be non-curved (namely, planer). Alternatively, each of the chamfer faces may be curved convexly or concavely.

In a preferred embodiment of the present invention, the chamfer portion is located adjacent to and surrounded by a flat portion which may include a polygonally arranged group of flat faces.

According to a second aspect of the present invention, there is provided a compacting device for making a capacitor element comprising: a main die member having a shaping bore; a lower die member insertable into the shaping bore of the main die member from below; and an upper die member for supporting an anode wire to project downwardly, the upper die member being insertable into the shaping bore of the main die member from above; wherein the upper die member has a bottom surface formed with a shaping recess having a bevel surface portion.

According to a third aspect of the present invention, there is provided a process for making a capacitor element by using a compacting device which comprises: a main die member having a shaping bore; a lower die member insertable into the shaping bore of the main die member from below; and an upper die member for supporting an anode wire to project downwardly, the upper die member being insertable into the shaping bore of the main die member from above, the upper die member having a bottom surface formed with a shaping recess having a bevel surface portion; wherein the method comprising the steps of: loading a predetermined amount of valve metal powder into the shaping bore of the main die member with the lower die member partially inserted in the shaping bore; inserting the upper die member into the shaping bore of the main die member for movement toward the lower die member to compact the loaded valve metal powder.

Other objects, features and advantages of the present invention will be apparent from the detailed description of a preferred embodiments given below with reference to the accompanying drawings.

DETAILED DESCRIPTION OF THE PREFERRED EMBODIMENTS

The preferred embodiments of the present invention will be described below with reference to FIGS. 1 through 9 of the accompanying drawings.

Figure 1:
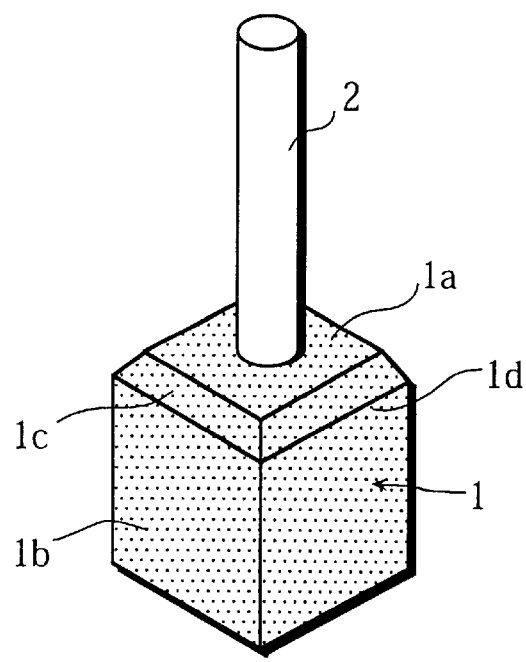
FIG. 1 is a perspective view showing a capacitor element according to a first embodiment of the present invention.
Figure 2:
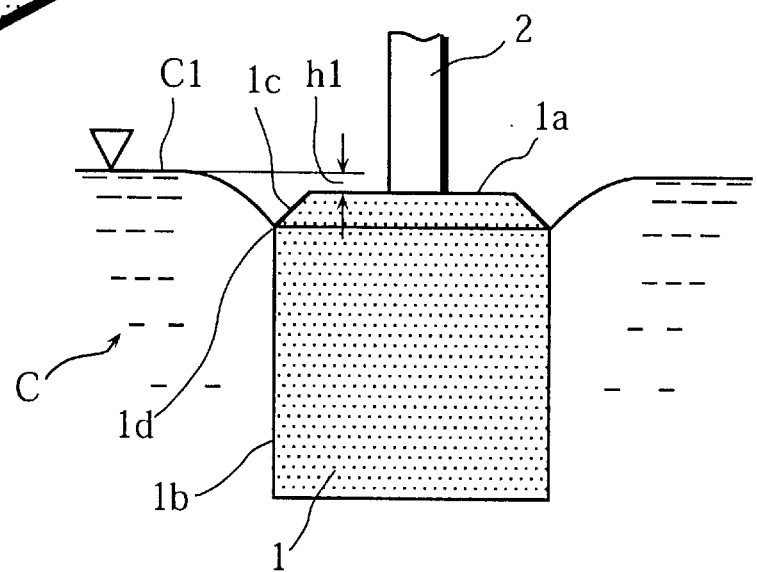
FIG. 2 is a front view of the same capacitor element under treatment for solid electrolyte formation.
Figure 3:
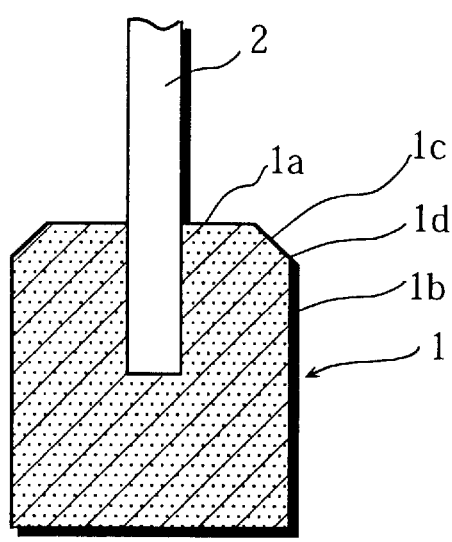
FIG. 3 is a vertical sectional view of the same capacitor element.

Reference is first made to FIGS. 1 through 3 illustrating a solid electrolytic capacitor element according to a first embodiment of the present invention. Like a conventional capacitor element, the capacitor element of this embodiment includes a porous capacitor chip 1 and an anode wire 2 projecting from an end face 1a (hereinafter referred to as "top face") of the chip 1. The capacitor chip 1, which is generally cubic in the illustrated embodiment, may be prepared by compacting valve metal powder such as tantalum powder into a porous mass and then sintering the porous mass. The anode wire 2 may be also made of tantalum or other metal. Normally, the anode wire 2 is partially embedded in the chip 1, as shown in FIG. 3.

The capacitor chip 1 has four side faces 1b. Further, the chip 1 also has a tetragonally arranged group of chamfer faces 1c each of which is located between the top face 1a and a respective side face 1b. Thus, the top face 1a, which is located adjacent to and surrounded by the group of chamfer faces 1c, is spaced from the side faces 1b by the intervention of the chamfer faces 1c.

Figure 11:
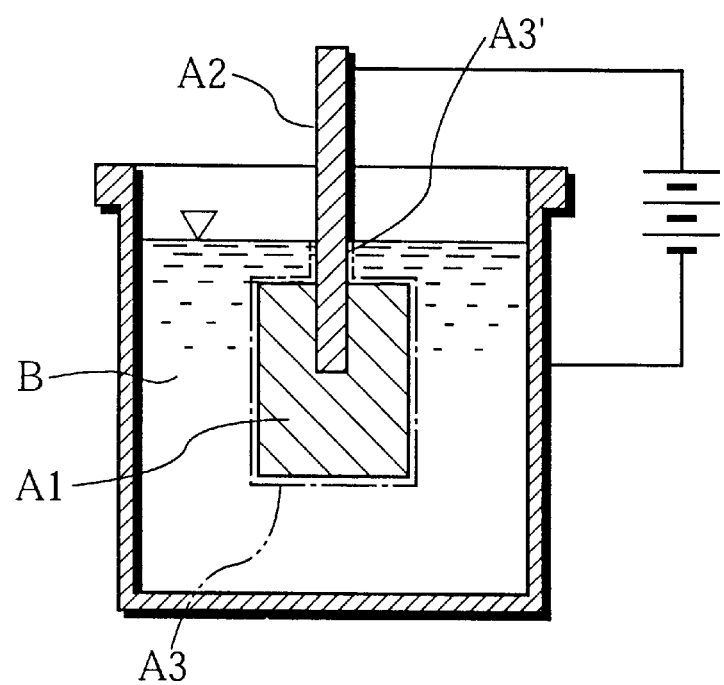
FIG. 11 is a sectional view showing a process step of forming a dielectric layer for the prior art capacitor element.
Figure 12:
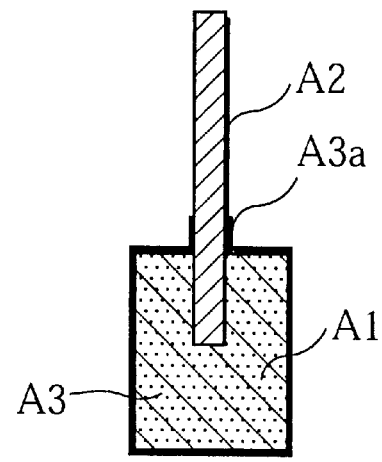
FIG. 12 is a sectional view showing the prior art capacitor element which has undergone the dielectric layer formation.

In manufacture, the porous sintered capacitor chip 1 thus configured is immersed in an aqueous solution of e.g. phosphoric acid (not shown) and subjected to anodic oxidation (electrolytic oxidation) by applying a direct current, as conventionally performed (see FIG. 11). As a result, a dielectric coating of e.g. tantalum pentoxide (not shown) is formed on the surfaces of the metal particles and on an immersed root portion of the anode wire 2 (see FIG. 12).

Figure 13:
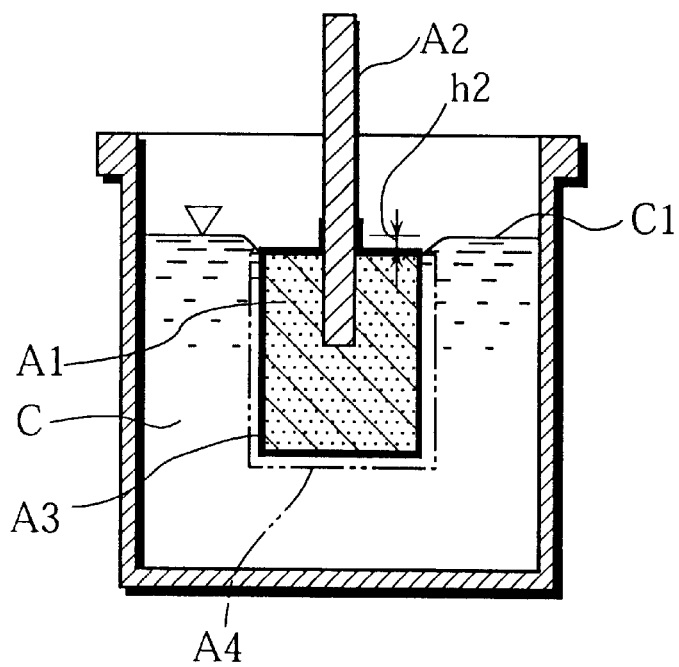
FIG. 13 is a sectional view showing a process step of forming a solid electrolyte layer for the prior art capacitor element.
Figure 14:
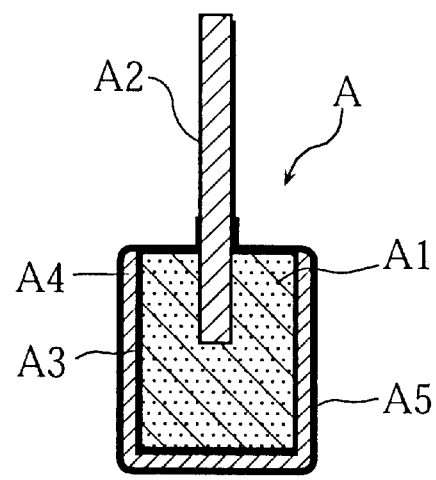
FIG. 14 is a sectional view showing the prior art capacitor element which has undergone the electrolyte layer formation.

Then, the dielectrically coated chip 1 is immersed in an aqueous solution C of e.g. manganese nitrate (see FIG. 2) to such an extent that the top face 1a of the chip 1 is not wet with the manganese nitrate solution, the chip 1 being thereafter taken out of the solution for baking. This step is repeated plural times to form a layer of solid electrolyte (e.g. manganese dioxide) on the dielectric coating (see FIG. 13).

Finally, a metallic cathode terminal layer (made of silver or nickel for example) is formed on the solid electrolyte layer with an intervening layer of e.g. graphite being interposed between the cathode terminal layer and the electrolyte layer.

Figure 10:
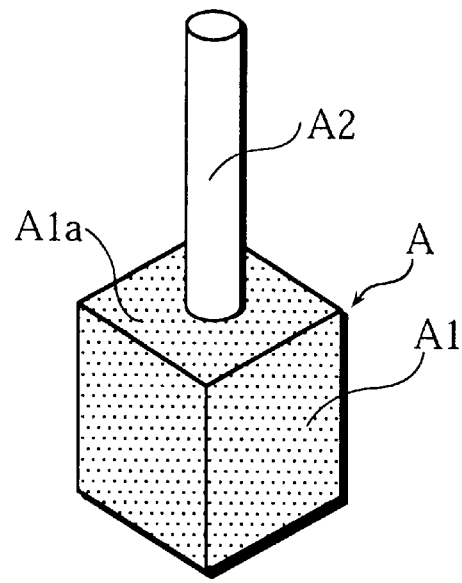
FIG. 10 is a perspective view showing a prior art capacitor element.

During the solid electrolyte formation step of the above-described manufacturing process, since each of the chamfer faces 1c is located between the top face 1a of the capacitor chip 1 and a respective side face 1b, the surface C1 of the manganese nitrate solution C extends from a boundary line 1d between the respective chamfer face 1c and the respective side face 1b with a bulge formed around the chip 1 due to the surface tension of the solution. Thus, the submergence depth h1 of the chip 1 relative to the manganese nitrate solution C defined as the distance between the top face 1a of the chip 1 and the surface C1 of the solution can be reduced by as much as the height of the chamfer faces 1c in comparison with the prior art capacitor chip (FIG. 10) wherein no chamfer face is provided.

In this way, even if the surface tension of the manganese nitrate solution C is imbalanced due to vibrations for example, the presence of the chamfer faces 1c prevents or restrains the solution flowing over the top face 1a of the capacitor chip 1, thereby reducing the likelihood that the formed solid electrolyte layer extends beyond the dielectric coating into direct contact with the anode wire 2. As a result, it is possible to reduce the possibility of producing a rejectable or inoperative capacitor element.

Figure 4:
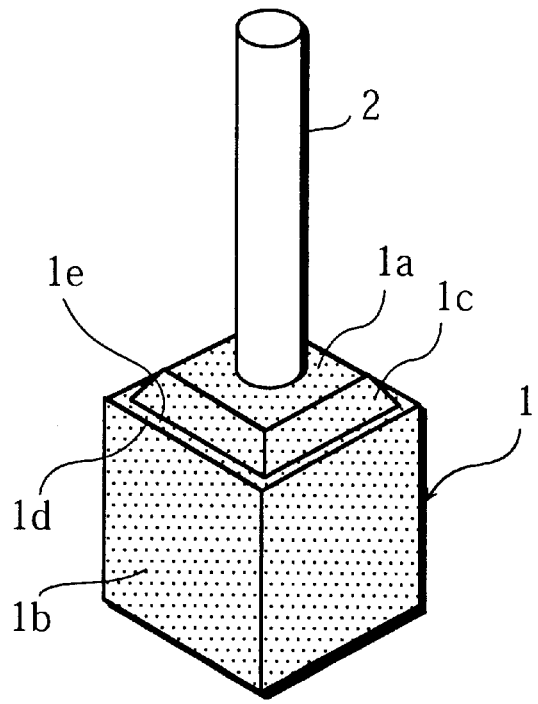
FIG. 4 is a perspective view showing a capacitor element according to a second embodiment of the present invention.
Figure 5:
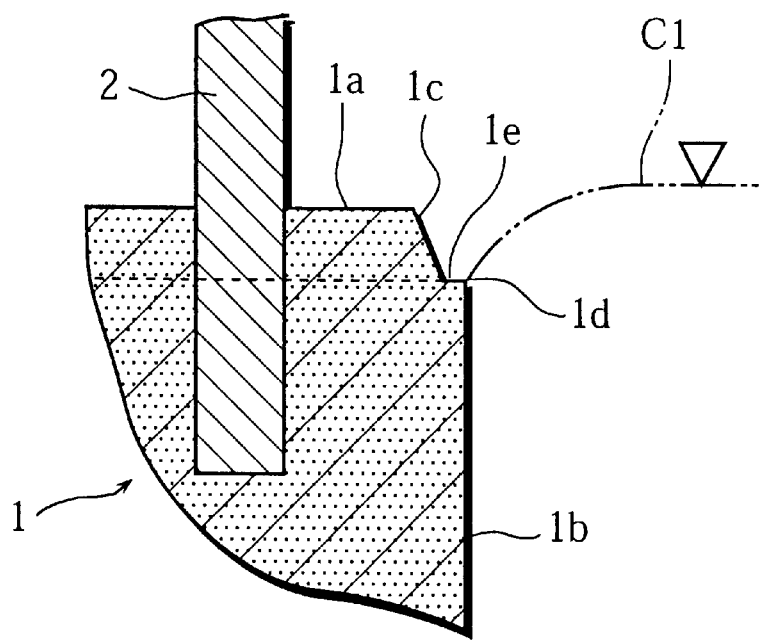
Fig. 5 is a fragmentary view, in vertical section, showing the capacitor element of FIG. 4.

FIGS. 4 and 5 show a capacitor element according to a second embodiment of the present invention. The capacitor element of this embodiment is similar to that of the foregoing embodiment but differs therefrom in that the tetragonally arranged group of chamfer faces 1c is located adjacent to and surrounded by a tetragonally arranged group of relatively narrow flat faces 1e.

Due to the provision of the flat faces 1e, the boundary line 1d between each flat face 1e and a respective side face 1b becomes sharply edged. As a result, when the capacitor chip 1 is immersed in the manganese nitrate solution C for formation of a solid electrolyte layer, it is ensured that the surface C1 of the solution starts bulging at the boundary line 1d (see FIG. 5), thereby reducing the possibility of producing a rejectable or inoperative capacitor element.

Figure 6:
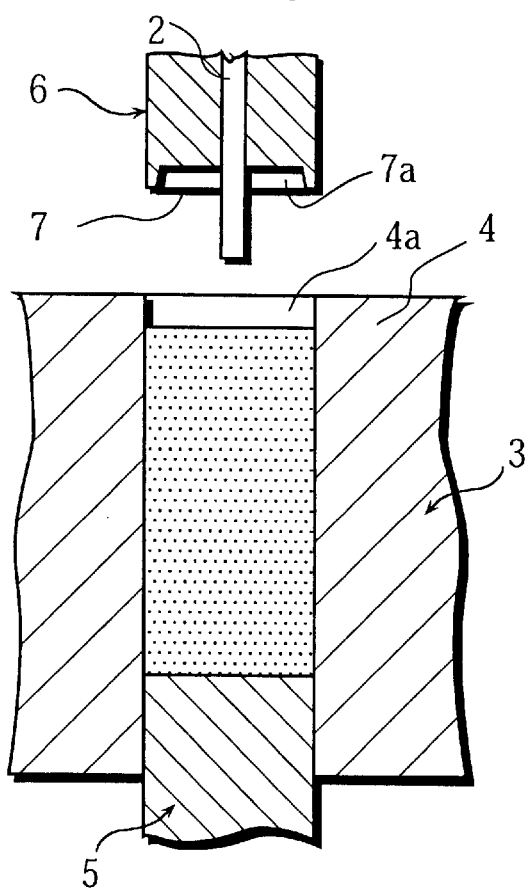
FIG. 6 is a vertical sectional view showing a compacting device used for making the capacitor element of FIGS. 4 and 5.
Figure 7:
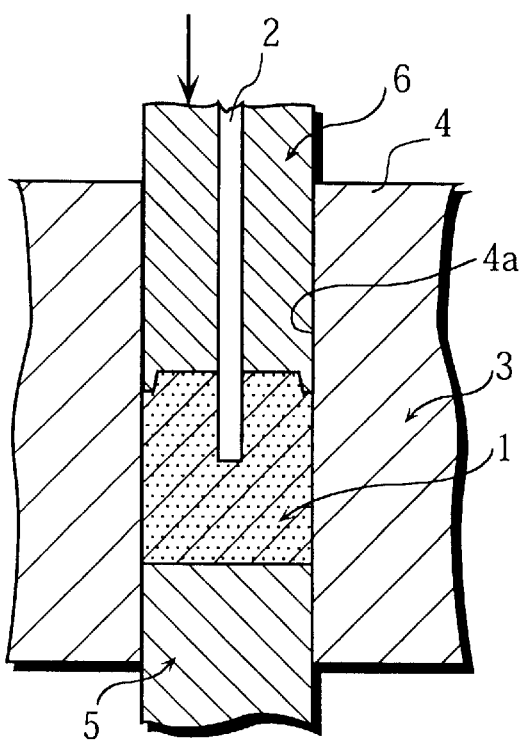
FIG. 7 is a vertical sectional view similar to FIG. 6 but showing the same compacting device in its state for compacting.

The capacitor chip 1 illustrated in FIGS. 4 and 5 may be advantageously prepared by using a compacting device shown in FIGS. 6 and 7. Specifically, the compacting device designated by reference numeral 3 includes a main die member 4 having a shaping bore 4a, a lower die member 5 slidably insertable into the shaping bore 4a of the main die member 4 from below, and an upper die member 6 slidably insertable into the shaping bore 4a from above. The die member 6 centrally supports a downwardly projecting anode wire 2 and has a bottom surface formed with a shaping recess 7 which is defined by a tetragonally arranged group of bevel faces 7a.

In use, a predetermined amount of valve metal powder is loaded in the shaping bore 4a of the main die member 4 with the lower die members 5 partially inserted in the shaping bore 4a. Then, the upper die member 6 supporting the anode wire 2 is inserted into the shaping bore 4a and moved downwardly toward the lower die member 5. Finally, the lower and upper die members 5, 6 are removed from the shaping bore 4a. As a result, a capacitor element is obtained which has the structure illustrated in FIGS. 4 and 5.

During the above-described process of preparing the capacitor element, the valve metal powder is compacted not only axially of the anode wire 2 but also transversely of the anode wire 2 due to the provision of the shaping recess 7 (having the bevel faces 7a) of the upper die member 6. As a result, a root portion of the anode wire 2 can be firmly fixed or embedded in the capacitor chip 1 with little likelihood of unexpected removal.

Figure 8:
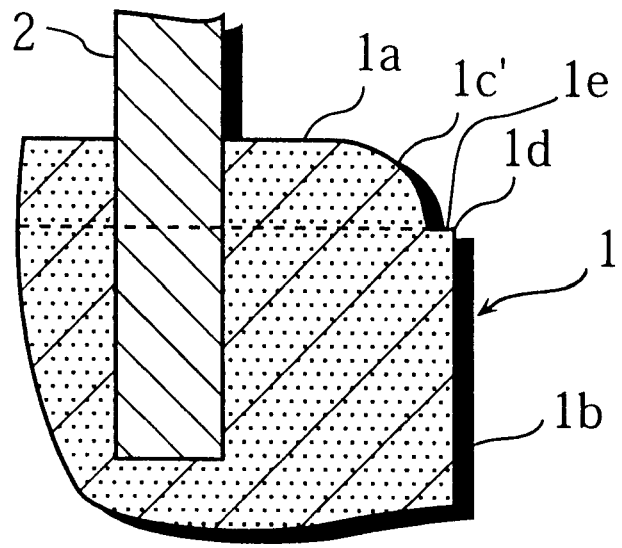
FIG. 8 is a fragmentary view, in vertical section, showing a capacitor element according to a third embodiment of the present invention.

FIG. 8 shows a capacitor element according to a third embodiment of the present invention. The capacitor element of this embodiment is similar to that of the second embodiment but differs therefrom in that the tetragonally arranged group of non-curved chamfer faces 1c is replaced by a tetragonally arranged group of convexly curved chamfer faces 1c'.

Figure 9:
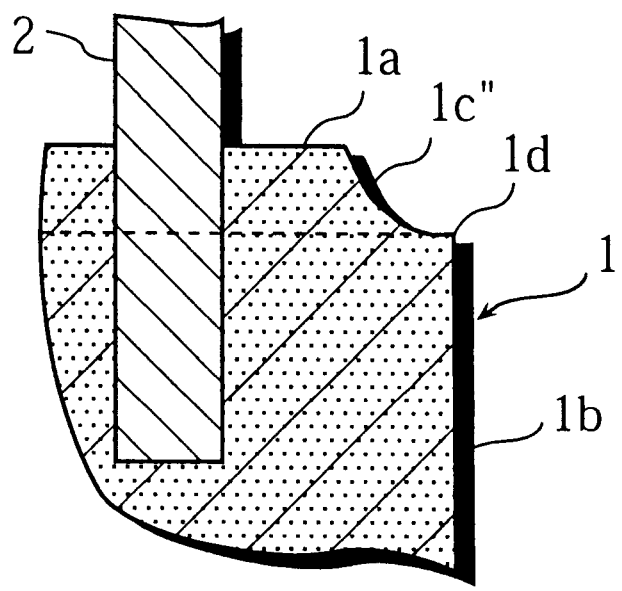
FIG. 9 is a fragmentary view, in vertical section, showing a capacitor element according to a fourth embodiment of the present invention.

FIG. 9 shows a capacitor element according to a fourth embodiment of the present invention. The capacitor element of this embodiment is similar to that of the second embodiment but differs therefrom in that the tetragonally arranged group of non-curved chamfer faces 1c is replaced by a tetragonally arranged group of concavely curved chamfer faces 1c".

The present invention being thus described, it is obvious that the same may be varied in many other ways. For instance, the capacitor chip may be cylindrical, in which case the tetragonally arranged group of chamfer faces is replaced by a frustoconical chamfer face. Such variations should not be regarded as a departure from the spirit and scope of the present invention, and all such modifications as would be obvious to those skilled in the art are intended to be included within the scope of the following claims.

We claim:

1. A capacitor element for a solid electrolytic capacitor comprising:

capacitor chip which is a compacted mass of valve metal powder, the capacitor chip having a first end and a second end face opposite to said first end face; and an anode wire projecting from said first end face of the capacitor chip; wherein the capacitor chip includes a chamfer portion located adjacent to and entirely surrounding said first end face but spaced from said second end face.

2. The capacitor element according to claim 1, wherein the capacitor chip is polygonal in cross section, the chamfer portion including a polygonally arranged group of chamfer faces.

3. The capacitor element according to claim 2, wherein each of the chamfer faces is curved.

4. The capacitor element according to claim 3, wherein each of the chamfer faces is convexly curved.

5. The capacitor element according to claim 3, wherein each of the chamfer faces is concavely curved.

6. The capacitor element according to claim 1, wherein the chamfer portion is located adjacent to and surrounded by a flat portion.

7. The capacitor element according to claim 2, wherein the polygonally arranged group of chamfer faces is located adjacent to and surrounded by a polygonally arranged group of flat faces.

* * * * *